Figure 1:
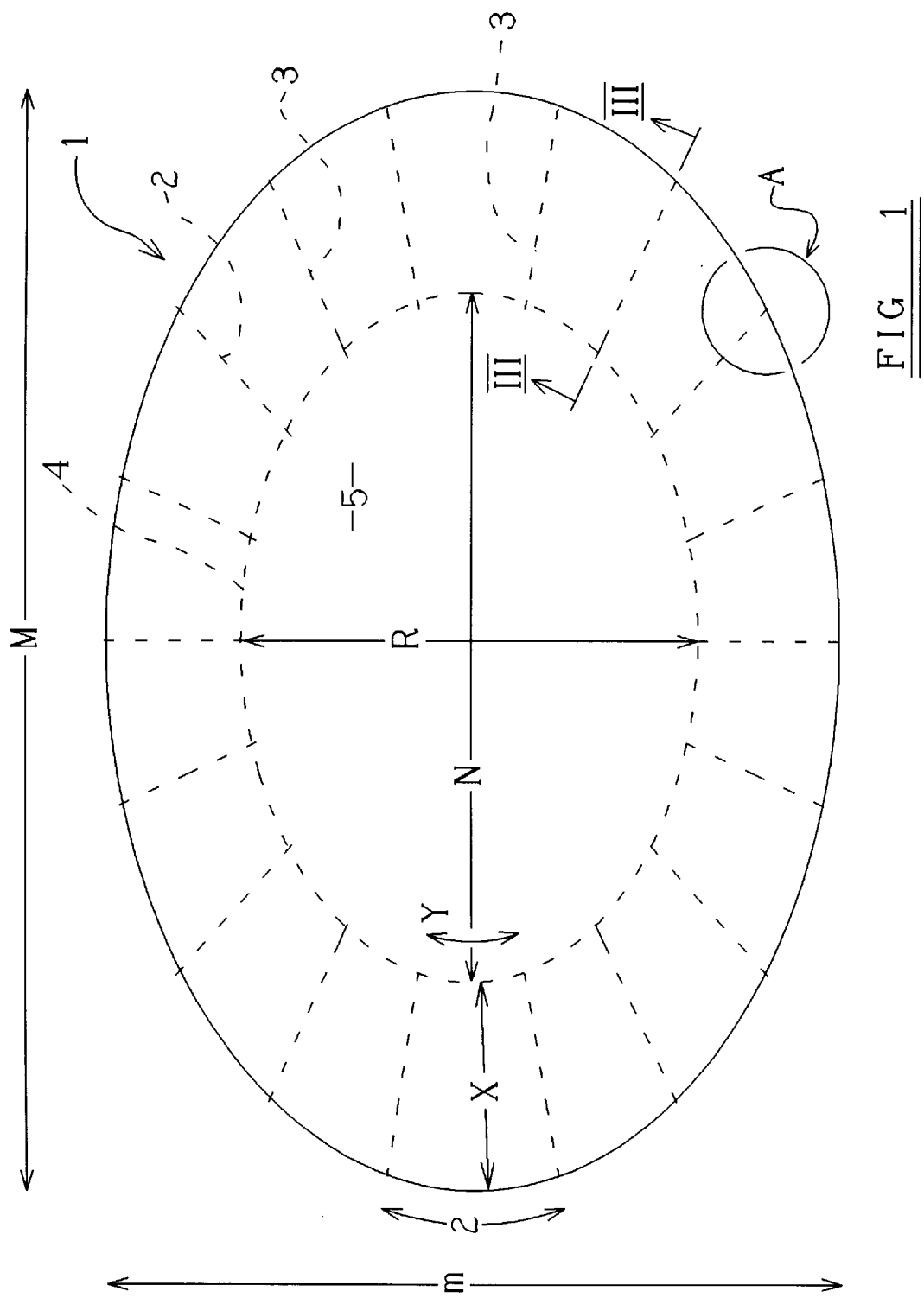

United States Patent [19]
Telfer et al.

[11] Patent Number: 5,830,519
[45] Date of Patent: Nov. 3, 1998

[54] MICROWAVABLE FOOD PRODUCT

[75] Inventors: Julie Telfer; Douglas Bethune, both of Northumberland, England

[73] Assignee: Grand Metropolitan, Food Sector, Minneapolis, Minn.

[21] Appl. No.: 529,906

[22] Filed: Sep. 18, 1995

Related U.S. Application Data

[63] Continuation of Ser. No. 195,163, Feb. 10, 1994, abandoned.

[30] Foreign Application Priority Data

Feb. 10, 1993 [GB] United Kingdom ................ 9302576

[51] Int. Cl.$^6$ .................................................. A21D 8/02
[52] U.S. Cl. ........................... 426/144; 426/241; 426/242; 426/243; 426/496; 426/503; 426/523; 426/556
[58] Field of Search .............................. 426/94, 107, 113, 426/144, 234, 241, 242, 243, 496, 503, 523, 556, 512

[56] References Cited

U.S. PATENT DOCUMENTS

| | | | |
|---|---|---|---|
| 2,072,793 | 3/1937 | Brennon | 426/503 X |
| 2,668,767 | 2/1954 | Lowe | 426/556 X |
| 2,686,540 | 8/1954 | Stahmer | 99/92 |
| 3,049,426 | 8/1962 | Dorsey et al. | 426/556 X |
| 4,027,132 | 5/1977 | Levinson | 426/243 X |
| 4,448,791 | 5/1984 | Iulde et al. | 426/94 |
| 4,606,923 | 8/1986 | Ricke | 426/496 |
| 4,696,823 | 9/1987 | DeChristopher | 426/512 X |
| 4,841,112 | 6/1989 | Peleg | 426/107 X |
| 4,870,233 | 9/1989 | McDonald et al. | 426/107 X |
| 4,885,180 | 12/1989 | Cochran et al. | 426/241 |
| 5,059,436 | 10/1991 | Clark | 426/107 |
| 5,104,669 | 4/1992 | Wolke et al. | 426/94 |
| 5,139,800 | 8/1992 | Anderson et al. | 426/243 |
| 5,194,273 | 3/1993 | de Bruijner et al. | 426/94 |
| 5,266,345 | 11/1993 | Corbin et al. | 426/555 |
| 5,281,433 | 1/1994 | Gantwerker et al. | 426/241 X |

*Primary Examiner*—Milton Cano
*Attorney, Agent, or Firm*—Merchant, Gould, Smith, Edell, Welter, & Schmidt, P.A.

[57] ABSTRACT

A microwavable food product comprises a crust which is formed of laminated pastry or dough. The crust has a uniform thickness and is provided with a pattern of depressions formed on the upper surface of the crust. The depressions include a plurality of depressions which each intersect the outer periphery of the crust. There are additional depressions in the peripheral region of the crust, and the depressions together, in the preferred embodiment, form substantially radially outwardly extending lines which run up to the outer periphery of the crust. The depressions are such that the region of each depression the thickness of the pastry is between one-half and one-third of the original thickness of the pastry.

19 Claims, 3 Drawing Sheets

MICROWAVABLE FOOD PRODUCT

This is a continuation of application Ser. No. 08/195,163, filed Feb. 10, 1994 now abandoned.

The present invention relates to a microwavable food product and more particularly relates to a microwavable food product comprising a crust, such as a laminated pastry or dough crust, for example a pie or tart.

Traditionally, pies and tarts for home-cooking have been packaged and sold in a metal receptacle, typically of aluminium or aluminium alloy, so that the product, in the metal receptacle, can be placed in a convection oven for cooking. When cooked in a convection oven such pies and tarts have an appearance and taste which is acceptable to consumers. Convection cooking, however, requires a long cooking time.

On the other hand, microwave cooking provides the benefit of a substantially shorter cooking time, as compared with a convection oven, and manufacturers of pies and tart products have been seeking an acceptable means for microwave cooking such products so that a product having an acceptable taste and appearance is produced after the microwave cooking process.

A major problem presently experienced with the use of a microwave oven to cook pastry or other dough items, is an inability to achieve an even rise. Pastry or dough cooked in a microwave oven often tends to rise unevenly and then collapses or falls over producing a cooked product which is unappetising. Another problem associated with the cooking of dough in a microwave oven is the inability to produce a uniformly crisp, browned dough. Often the dough crust is soft or soggy and is non-uniformly baked after microwave cooking. When the dough is used in a pie or tart product having a filling, it is difficult, if not impossible, using presently available methods, to provide uniform heating of the filling while the dough is being baked or browned. Often the filling is either under-cooked or over-cooked.

It has been proposed, in an attempt to overcome these problems, to utilise a special type of carton or receptacle for a pie or tart product which is to be cooked in a microwave oven, which prevents the pastry or dough from falling over during cooking, and thus achieves a substantially even rise. It has also been proposed to use a susceptor sheet placed directly on top of the dough or pastry in some pie products to achieve uniform heating of the crust as the crust rises during microwave cooking.

The present invention seeks to provide an improved dough or pastry product adapted for microwave cooking and a pie product incorporating the dough or pastry product.

According to this invention there is provided a microwavable food product comprising a crust formed of laminated pastry or dough, the crust having a substantially uniform thickness and having a pattern of depressions formed on the upper surface of the crust, the pattern of depressions comprising at least a plurality of depressions which each intersect the outer periphery of the crust, and a plurality of additional depressions in the peripheral region of the crust, the depressions intersecting the periphery of the crust being such that in those depressions the thickness of the pastry or dough is between one-half and one-third of the said thickness of the crust.

It has been found that when a crust having the depressions described above is cooked in a microwave oven, the crust cooks in a uniform way.

It is preferred that the depressions are of such an effective depth that in the depressions intersecting the periphery of the crust, the thickness of the pastry or dough is approximately one-half of the original substantially uniform thickness of the dough.

The additional depressions in the peripheral region of the crust may preferably define a plurality of radially inwardly directed lines, extending inwardly from the periphery of the crust, the terminal depression in each said line being the depression which intersects the outer periphery of the crust.

Advantageously the crust is provided with a line of depressions concentric with the periphery of the crust, defining an inner or central region of the crust. After cooking, the inner or central region may be broken away or cut away, thus leaving a recess into which pie filling may be placed when the product is served.

Preferably each depression has a length of between 3 mm and 10 mm and a width of between 1 mm and 5 mm, and the depth of each depression is preferably between 0.5 mm and 5 mm. When the depressions are in lines, the spacing between adjacent depressions is preferably between 0.5 mm and 5 mm.

Preferably the spacing about the periphery of the crust between the depressions which intersect the outer periphery of the crust is 30 m or less, typically being between 30 mm and 25 mm.

The concentric line of depressions may be spaced from the outer periphery of the crust by between 20 mm and 30 mm, the preferred spacing being 25 mm.

A browning agent may be applied to the crust, and water may be applied to the crust substantially simultaneously with the browning agent.

A product in accordance with the invention may further comprise a pie filling. The pie filling may be savory or sweet. Preferably the filling is contained within a receptacle formed of a material suitable for use in a microwave oven, the receptacle being provided with a cover, the said crust lying on the cover.

Figure 2:
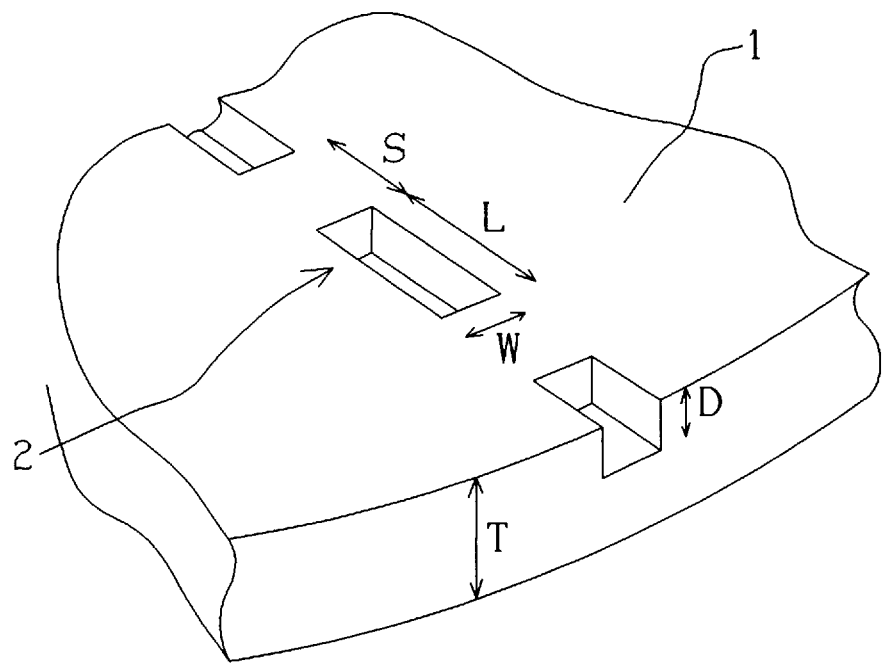
Figure 3:
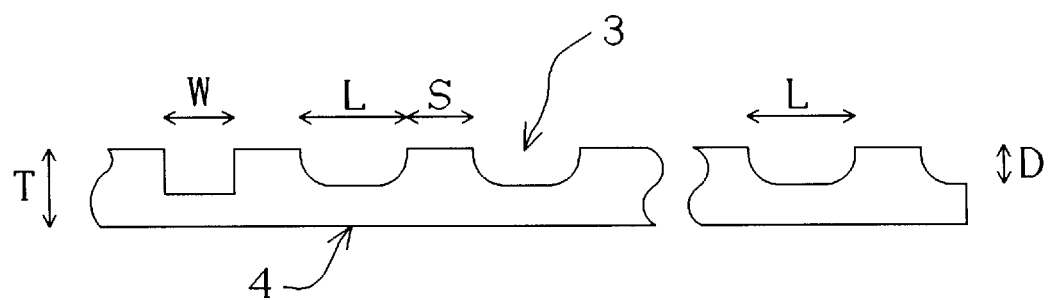
Figure 4:
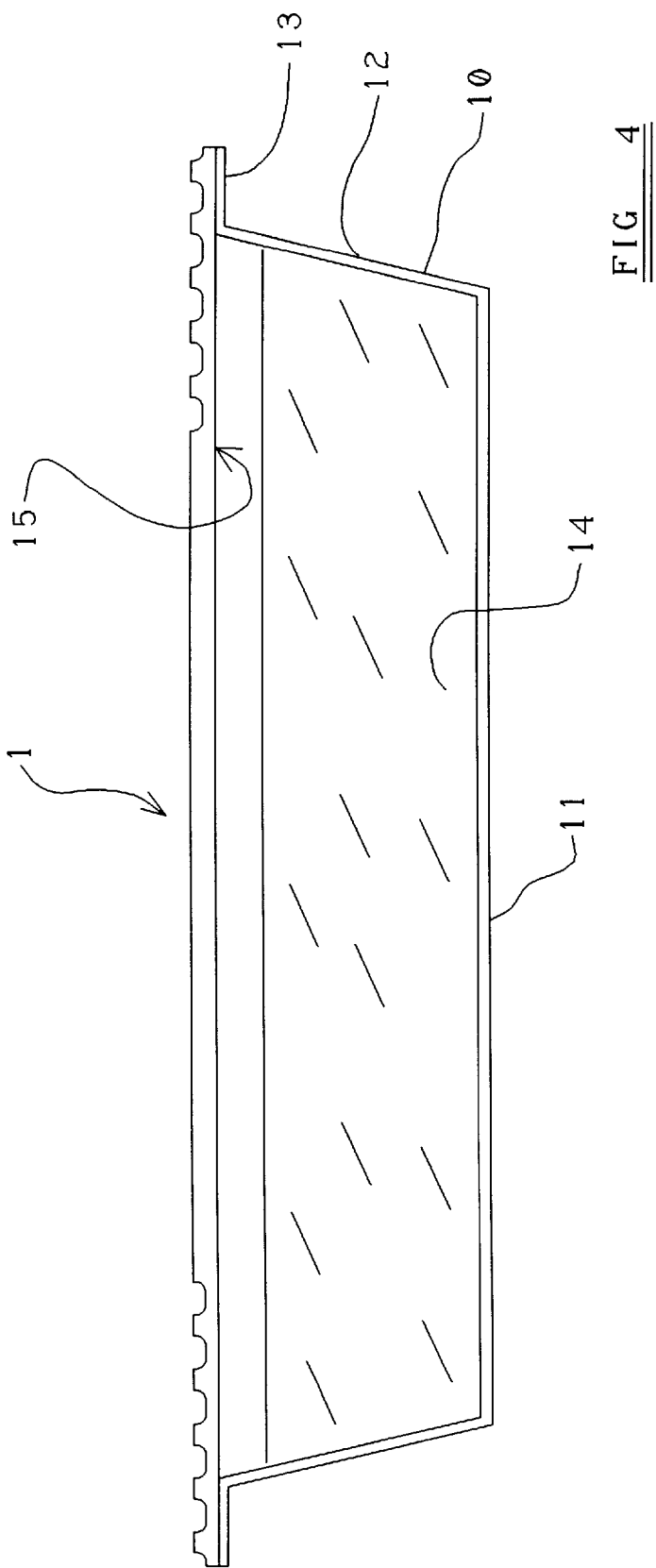

In order that the invention may be more readily understood, and so that further features thereof may be appreciated, the invention will now be described, by way of example, with reference to the accompanying drawings in which FIG. 1 is a top plan view of a dough or pastry crust for a pie product, FIG. 2 is an enlarged perspective view of the part of the crust indicated by the circle "A" in FIG. 1, FIG. 3 is a sectional view, with part broken away, taken on the line III—III of FIG. 1, and FIG. 4 is a sectional view through a pie product incorporating a pastry crust as illustrated in FIGS. 1 to 3.

FIGS. 1 to 3 illustrate a crust 1 intended to be cooked in a microwave oven. The crust is a laminated crust formed of any appropriate dough or pastry, and the illustrated crust is of oval form having a major axis "M" of approximately 225 mm and a minor axis "m" of approximately 175 mm.

The pastry is rolled out to have a substantially uniform thickness "T". The crust thus has a substantially flat top, and its periphery is defined by a substantially vertical cut. A pattern of depressions 2 is then embossed in the upper surface of the pastry. A single dies may be used to produce the depressions, or individual dies may be used to produce parts of the pattern defined by the depressions 2.

The depressions 2, in the described example, comprise a series of substantially radially extending lines 3 of depressions located in the peripheral region of the oval crust extending inwardly from the outer periphery of the crust, the lines 3 of depressions each having a terminal depression which intersects the outer periphery of the crust. The inner ends of the radial lines of depressions 3 are bounded by an oval line 4 of depressions, which is concentric with the periphery of the crust 1. The oval line of depressions 4 defines an inner oval region 5 of the crust which has a major axis "N" of approximately 175 mm and a minor axis "n" of approximately 125 mm.

In this embodiment of the invention the distance "X" between the oval line 4 of depressions, which defines the outer edge of the inner region 5 of the crust, and the outer periphery of the crust 1, is approximately 25 mm, but in other embodiments this distance may be selected to be between and 20 and 30 mm. The distance "Y" between the inner ends of the liens 3 of depressions is typically between 17 and 22 mm, whereas the distance "Z" between the points where adjacent lines of depressions 3 intersect the outer periphery of the crust 1 is typically between 25 and 30 mm. It has been found that the maximum acceptable spacing is approximately 30 mm, but a closer spacing is not disadvantageous. However, there must be some spacing between adjacent depressions 2 at the periphery of the crust.

FIGS. 2 and 3 illustrate the depressions 2 in greater detail. The depressions 2 form a series of elongate axially aligned depressions of generally rectangular form, the depressions thus resembling "dotted lines". Each depression has a length "L" of between 3 and 10 mm and a width of between 1 and 5 mm. The depth "D" of each depression is between 0.5 and 5 mm, but is preferably of the order of one-half of the thickness "T" of the crust, although the depth of each depression may be less than one-half of the thickness "T" lying in the range between one-half and one-third of the thickness "T". The spacing "S" between adjacent depressions is between 0.5 mm and 5 mm.

It is important that the terminal depression 2 in each of the lines 3 of the depressions should intersect the periphery of the pastry crust 1 as shown in FIG. 1 so that, where each line 3 of depressions meets the periphery of the pastry crust 1 the thickness of the pastry crust 1 is less than the original thickness "T" of the crust.

Thus, at each of a plurality of points substantially evenly spaced around the periphery of the crust, a depression is provided which reduces the thickness of the crust to between one-half and two-thirds of the initial thickness of the crust, preferably approximately one-half of the initial thickness "T".

The applicants have found that the provision of these depressions at the periphery of the crust and in the peripheral region of the crust significantly improves the rising characteristics of the crust when the crust is cooked in a microwave oven.

The depressions forming the oval line 4 of depressions are of the same form as the depressions forming the radially extending lines 3 of depressions, but are provided primarily to define the central region 5 of the crust. After the crust has been cooked it is possible to break away the central region 5 of the crust, and the outer part of the crust may then be served with a filling located in the opening or aperture left where the central region 5 of the crust has been removed.

The crust illustrated in FIGS. 1 to 3 may be provided with a surface coating of a browning agent, before or after the pattern of depressions is formed to avoid the need for using a susceptor material to achieve browning during microwave cooking. The browning agent may be mixed with water, or water may be applied to the crust before the browning agent is applied.

The crust 1 may be provided on an appropriate support formed of a material which can safely be introduced into a microwave oven such as paper, fibreboard, cardboard, plastic or ceramic or the like, or may, as illustrated in FIG. 4, be provided on a pie product.

Referring to FIG. 4 a pie product comprises a receptacle 10 in the form of a lipped container formed of a material suitable for use in a microwave oven. Examples of such materials are paper, fibreboard and cardboard, which may be waxed or plastic-coated, plastic materials and ceramic materials. The receptacle 10 comprises a base 11 having an upstanding but slightly outwardly inclined side wall 12 which terminates, at its upper edge, in a outwardly directed substantially horizontal lip 13. An appropriate filling 14 is located in the receptacle. The filling may be sweet or savory. A lid or cover 15 is then located on the receptacle, extending to the outer periphery of the lip 13. The cover is formed of an appropriate material such as a microwavable plastic film, such as a film made of polyethylene terephthalate, for example the film sold under the Registered Trade Mark MYLAR. The crust 1 described above is located on top of the cover 15. The entire product may then be cooked in the microwave oven, simultaneously baking the crust and heating the pie filling.

When the cooking procedure is finished the pie may be served in various ways. The pastry crust may be placed on a plate. The central region may be removed from the crust before the filling is located in position on the crust, the filling then effectively occupying the space left by the central region of the crust. Alternatively the filling may be located on a plate and the crust may be placed on top of the filling.

It is to be appreciated that whilst one shape of crust has been described above, crusts of various shapes may be utilised, including circular shapes, traditional for fruit pies, and rectangular shapes, traditional for meat pies.

The time taken to cook the product depends upon the size of the product and also upon whether the product is initially frozen or just chilled.

The invention will now further be described by way of a specific example.

EXAMPLE

A pie product consists of a filling located in a receptacle suitably received in a microwave oven, having dimensions of 125 mm×184 mm×35 mm and a volume of 368 mls. The filling contained within the receptacle was chili con carne and had a height of 19 mm. The ingredients for making the filling are listed below:

| Ingredients | (%) |
| --- | --- |
| 70% V.L. Frozen Minced Beef | 20.00 |
| Frozen Mixed Peppers | 9.67 |
| Tinned Tomatoes | 6.42 |
| Red Wine Vinegar | 7.50 |
| Garlic Puree | 2.66 |
| Tomato Puree | 0.17 |
| Col-Flo 67 | 8.00 |
| Chili Premix | 1.67 |
| Kidney Bean | 11.83 |
| Water | 30.33 |

A cover extended across the open top of the receptacle and supported a flat laminated dough crust. The cover sealed the receptacle so that heat produced within the receptacle during microwave cooking of the filling would not effect the laminated dough.

The formulation and process for the dough manufacture is as follows:

| Ingredients | |
|---|---|
| Dough | % |
| Strong Wheatflour | 35.0–45.0 |
| Pastry Margarine | 9.0–16.0 |
| Salt | 0.3–0.5 |
| Water | 17.0–23.0 |
| Laminating Fat | 16.0–24.0 |

The pastry is made by the French method of mixing a dough on high speed or low speed mixers followed by extruding dough and laminating fat to form a layer of fat between two layers of dough. This dough is then be further laminated to give between 80 and 140 fat layers.

A browning agent comprising, as essential ingredients, modified starch and stabilizer (E415) was used. However, before it was applied water was sprayed onto the surface of the dough. The browning agent and water were applied in the following ratios:

| Ingredient | | (%) |
|---|---|---|
| Pastry Weight | 47.0 g | 94.00 |
| Browing Agent | 1.5 g | 3.00 |
| Water | 1.5 g | 3.00 |

The resultant product was a 180 gram product, and was cooked in a 650 watt microwave oven for five minutes on full power. The dough then formed a crispy brown crust. Once cooked, the central region of the crust, as indicated by the pattern on the pastry, was cut and removed, leaving a cavity into which the filling was then placed.

We claim:

1. A microwavable food product comprising a laminated pastry or dough which will form a crust upon cooking, said pastry or dough having a substantially uniform thickness and a pattern of depressions embossed on the upper surface of the pastry or dough such that the thickness of the pastry or dough in the depressions is between one-half and one-third of the overall thickness of the pastry or dough; wherein the embossed pastry or dough rises evenly and cooks uniformly in a microwave oven whereby said patterns of depressions permit even rising and uniform cooking of the crust when the crust is cooked in a microwave oven.

2. A product according to claim 1, wherein the thickness of the pastry or dough in the depressions is approximately one-half of the said substantially uniform thickness.

3. A product according to claim 1 wherein the pastry or dough is provided with a line of depressions concentric with the periphery of the pastry or dough, defining an inner or central region of the crust.

4. A product according to claim 3 wherein the spacing between adjacent depressions in each of said lines of depressions is between 0.5 mm and 5 mm.

5. A product according to claim 3 wherein the concentric line of depressions is spaced from the outer periphery of the pastry or dough by between 20 and 30 mm.

6. A product according to claim 5 wherein the concentric line of depressions is spaced from the outer periphery of the pastry or dough by a distance of 25 mm.

7. A product according to claim 1 wherein each depression has a length of between 3 and 10 mm and a width of between 1 and 5 mm.

8. A product according to claim 1 wherein the depth of each depression is between 0.5 mm and 5 mm.

9. A product according to claim 1 wherein spacing about a periphery of the pastry or dough between depressions which intersect an outer periphery of the pastry or dough is 30 mm or less.

10. A product according to claim 9 wherein the spacing between the depressions which intersect the periphery of the pastry or dough is between 30 mm and 25 mm.

11. A product according to claim 1 wherein a browning agent is applied to the pastry or dough.

12. A product according to claim 1 further comprising a pie filling.

13. A product according to claim 12 wherein said filling is contained within a receptacle formed of a material suitable for use in a microwave oven, the receptacle being provided with a cover, said pastry or dough lying on the cover.

14. A microwavable food product comprising a laminated pastry or dough which will form a crust upon cooking, said pastry or dough having a substantially uniform thickness and a pattern of depressions embossed on the upper surface of the pastry or dough such that the thickness of the pastry or dough in the depressions is between one-half and one-third of the overall thickness of the pastry or dough; wherein the embossed pastry or dough rises evenly and cooks uniformly in a microwave oven, and wherein a plurality of additional depressions define a plurality of lines directed radially inward from the periphery of the crust, the terminal depression of each line being a depression that intersects the outer periphery of the crust whereby said patterns of depressions permit even rising and uniform cooking of the crust when the crust is cooked in a microwave oven.

15. A microwavable food product comprising a laminated pastry or dough which will form a crust upon cooking, said pastry or dough having a substantially uniform thickness and a pattern of depressions embossed on the upper surface of the pastry or dough, said pattern of depressions comprising at least a plurality of depressions that each intersect the outer periphery of the crust and a plurality of additional depressions in the peripheral region of the crust, the depressions intersecting the periphery of the crust being such that in those depressions the thickness of the pastry or dough is between one-half and one-third of the overall thickness of the pastry or dough; wherein the embossed pastry or dough rises evenly and cooks uniformly in a microwave oven wherein said patterns of depressions permit even rising and uniform cooking of the crust when the crust is cooked in a microwave oven.

16. A product according to claim 15, wherein the thickness of the pastry or dough in the depressions is approximately one-half of the substantially uniform thickness.

17. A product according to claim 15, wherein a plurality of additional depressions define a plurality of radially inwardly directed lines, extending inwardly from the periphery of the crust, the terminal depression of each said line being a depression which intersects the outer periphery of the crust.

18. A product according to claim 15, wherein spacing about a periphery of the crust between depressions which intersect an outer periphery of the crust is 30 mm or less.

19. A product according to claim 15 further comprising a pie filling.

\* \* \* \* \*